(12) United States Patent
Xu et al.

(10) Patent No.: US 7,924,330 B2
(45) Date of Patent: Apr. 12, 2011

(54) METHODS AND APPARATUSES FOR DOUBLE SIDED DARK REFERENCE PIXEL ROW-WISE DARK LEVEL NON-UNIFORMITY COMPENSATION IN IMAGE SIGNALS

(75) Inventors: Chen Xu, Alhambra, CA (US); Yaowu Mo, Arcadia, CA (US); Mei Yan, Pasadena, CA (US)

(73) Assignee: Aptina Imaging Corporation, George Town (KY)

( * ) Notice: Subject to any disclaimer, the term of this patent is extended or adjusted under 35 U.S.C. 154(b) by 728 days.

(21) Appl. No.: 12/004,035

(22) Filed: Dec. 20, 2007

(65) Prior Publication Data

US 2009/0160979 A1    Jun. 25, 2009

(51) Int. Cl.
*H04N 9/64*     (2006.01)
(52) U.S. Cl. ........................................................ 348/243
(58) Field of Classification Search .................. 348/241, 348/243
See application file for complete search history.

(56) References Cited

U.S. PATENT DOCUMENTS

| | | | |
|---|---|---|---|
| 6,888,568 B1 | 5/2005 | Neter | |
| 6,965,407 B2 | 11/2005 | Boemler et al. | |
| 7,511,747 B2 * | 3/2009 | Hornig | 348/243 |
| 7,564,489 B1 * | 7/2009 | Oten et al. | 348/241 |
| 7,679,659 B2 * | 3/2010 | Kobayashi et al. | 348/243 |
| 2004/0141075 A1 | 7/2004 | Xu et al. | |
| 2005/0185075 A1 | 8/2005 | Neter | |
| 2005/0219388 A1 * | 10/2005 | Hornig | 348/241 |
| 2005/0243193 A1 * | 11/2005 | Gove et al. | 348/241 |
| 2006/0054783 A1 | 3/2006 | Voronov et al. | |
| 2006/0098888 A1 | 5/2006 | Morishita | |
| 2006/0192864 A1 | 8/2006 | Mauritzson | |
| 2006/0231734 A1 | 10/2006 | Shaw | |
| 2006/0232689 A1 | 10/2006 | Ito et al. | |
| 2006/0237628 A1 | 10/2006 | Moody et al. | |
| 2006/0262204 A1 | 11/2006 | Dosluoglu | |
| 2007/0019085 A1 | 1/2007 | Suzuki | |
| 2007/0045632 A1 | 3/2007 | Oliver et al. | |
| 2007/0052813 A1 | 3/2007 | Neter | |
| 2007/0131846 A1 * | 6/2007 | Eskerud | 250/208.1 |
| 2008/0239111 A1 * | 10/2008 | Jiang | 348/243 |

FOREIGN PATENT DOCUMENTS

| | | |
|---|---|---|
| JP | 2001-245215 | 9/2001 |
| JP | 2005-079948 | 3/2005 |
| JP | 2005-311736 | 11/2005 |
| JP | 2006-005663 | 1/2006 |
| JP | 2006-013948 | 1/2006 |
| JP | 2007-019820 | 1/2007 |
| WO | WO 2006/115315 A1 | 11/2006 |

OTHER PUBLICATIONS

Jaroslav Hynecek, "Design and Performance of a High-Resolution Image Sensor for Color TV Applications," IEEE Transactions on Electron Devices, vol. ED-32, No. 8, Aug. 1985, pp. 1421-1429.

(Continued)

*Primary Examiner* — Jason Chan
*Assistant Examiner* — Gary C Vieaux

(57) ABSTRACT

Methods and apparatuses for row-wise dark level non-uniformity compensation of imaging sensor pixel signals. A column dependent dark reference value is determined as one of a linear and parabolic function of signal values from two areas of dark reference pixels and a column location and then used for dark level non-uniformity compensation of signal values from imaging pixels.

9 Claims, 12 Drawing Sheets

OTHER PUBLICATIONS

Hideshi Abe, "Device Technologies for High Quality and Smaller Pixel in CCD and CMOS Image Sensors," Electron Device Meeting, 2004, IEDM Technical Digest, IEEE International Publication Date Dec. 13-15, 2004; pp. 40.1.1-40.1.4.

S. Abdallah, et al., "A General Overview of Solid States Imaging Sensors Types," Third Workshop on Photonics and Its Application at Egyptian Engineering Faculties and Institutes, 2002, pp. 1-10.

* cited by examiner ously known as discussed, for example, in U.S. Pat. Nos.
METHODS AND APPARATUSES FOR DOUBLE SIDED DARK REFERENCE PIXEL ROW-WISE DARK LEVEL NON-UNIFORMITY COMPENSATION IN IMAGE SIGNALS

FIELD OF THE INVENTION

The embodiments described herein relate generally to imaging devices and, more specifically, to methods and apparatuses for row-wise dark level non-uniformity compensation in image signals from imaging sensors employed in such devices.

BACKGROUND OF THE INVENTION

Solid state imaging devices, including charge coupled devices (CCD), complementary metal oxide semiconductor (CMOS) imaging devices, and others, have been used in photo imaging applications. A solid state imaging device circuit includes a focal plane array of pixel cells or pixels as an imaging sensor, each cell including a photosensor, which may be a photogate, photoconductor, a photodiode, or other photosensor having a doped region for accumulating photo-generated charge. For CMOS imaging devices, each pixel has a charge storage region, formed on or in the substrate, which is connected to the gate of an output transistor that is part of a readout circuit. The charge storage region may be constructed as a floating diffusion region. In some CMOS imaging devices, each pixel may further include at least one electronic device such as a transistor for transferring charge from the photosensor to the storage region and one device, also typically a transistor, for resetting the storage region to a predetermined charge level prior to charge transference.

In a CMOS imaging device, the active elements of a pixel perform the necessary functions of: (1) photon to charge conversion; (2) accumulation of image charge; (3) resetting the storage region to a known state; (4) storage of charge in the storage region; (5) selection of a pixel for readout; and (6) output and amplification of a signal representing pixel charge. Photo charge may be amplified when it moves from the initial charge accumulation region to the storage region. The charge at the storage region is typically converted to a pixel output voltage by a source follower output transistor.

CMOS imaging devices of the type discussed above are generally known as discussed, for example, in U.S. Pat. Nos. 6,140,630, 6,376,868, 6,310,366, 6,326,652, 6,204,524, and 6,333,205, assigned to Micron Technology, Inc.

Ideally, the digital images created by a CMOS imaging device are exact duplications of the light image projected upon the device pixel array. That is, for a flat-field image, all of the imaging pixel signals should have the same signal value. However, various noise sources can affect individual pixel outputs and thus distort the resulting digital image. As CMOS pixel arrays increase in size to obtain higher resolution, the physical non-uniformity of the arrays becomes more prominent. One issue occurring in higher resolution imaging sensors, such as, for example, eight or more megapixel sensors, is row-wise dark level non-uniformity that increases across the pixel array as the column number increases, causing a horizontal shading across the array. For example, FIG. 1 represents imaging pixel signal values of a row n of a flat-field image and shows an exponentially increasing pixel signal value as the column number increases. The increasing pixel signal value is due to row-wise dark level non-uniformity noise and will appear as a horizontal shading across the array. This shading across the array might not be significant in lower resolution imaging sensors having fewer columns of pixels or imaging devices with lower pixel clock frequencies. However, the shading across the array is more pronounced in higher resolution imaging sensors (e.g., greater than 1750 columns) and imaging devices with high pixel clock frequency (e.g., greater than 75 MHz). Accordingly, improved row-wise dark level non-uniformity compensation methods and apparatuses are needed.

DETAILED DESCRIPTION OF THE INVENTION

In the following detailed description, reference is made to the accompanying drawings which form a part hereof, and in which is shown by way of illustration specific embodiments that may be practiced. These embodiments are described in sufficient detail to enable those of ordinary skill in the art to make and use them, and it is to be understood that structural, logical, or procedural changes may be made to the specific embodiments disclosed.

Row-wise dark level non-uniformity has two components, amplitude and phase. When row-wise dark level non-uniformity compensation is applied, if a pixel signal value being corrected and a dark reference value are well correlated (i.e., have the same phase), dark level non-uniformity will be suppressed. When row-wise dark level non-uniformity compensation is applied, if the pixel signal value being corrected and the dark reference value are not well correlated (i.e., do not have the same phase), dark level non-uniformity may be undesirably amplified. The higher the pixel clock frequency, the bigger the difference in phase. This results in an even more undesirably amplified dark level non-uniformity. This amplified dark level non-uniformity appears as horizontal shading across the array.

Figure 2:
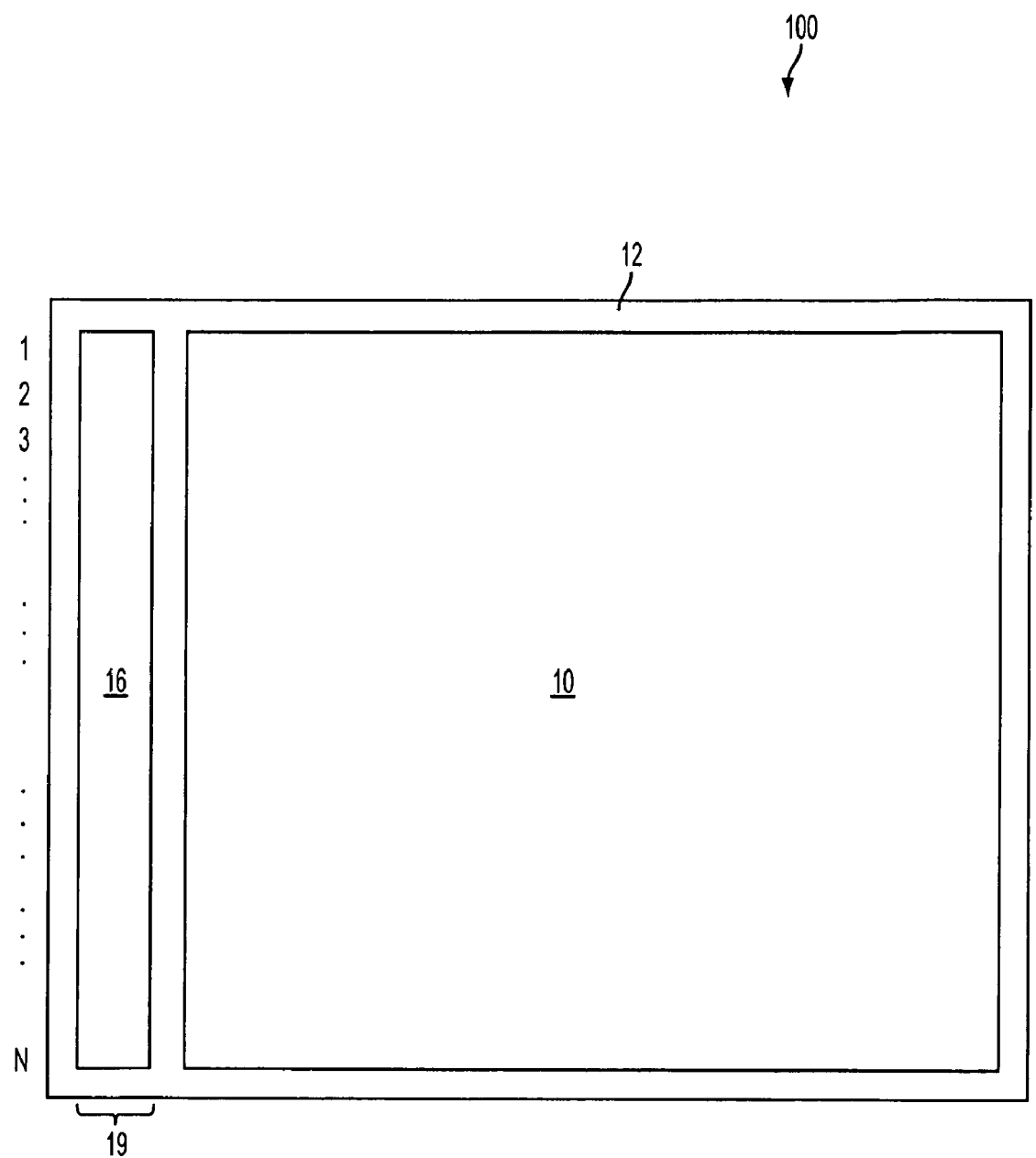
FIG. 2 illustrates a top view of a CMOS pixel array with dark columns located at one side of the pixel array.

For example, one row-wise dark level non-uniformity compensation method uses dark reference pixels, for example, optical black or tied pixels (pixels in which the photodiode is tied to a fixed voltage, as described in published U.S. patent application Ser. No. 11/066,781, filed Feb. 28, 2005, and having publication number 2006-0192864) from one side of a pixel array to determine a dark reference value for dark level non-uniformity compensation. This single sided row-wise dark level non-uniformity compensation results in dark level non-uniformity amplification and horizontal shading across the array, for example, in higher resolution imaging sensors, because the dark level non-uniformity compensated imaging pixel signal values on the right side of the array are not well correlated with the dark reference value. FIG. 2 shows an example CMOS pixel array 100 with an area 10 that contains rows and columns of imaging pixels, an area 12 that contains rows and columns of barrier pixels which separate the imaging pixels from other pixels and circuits, and an area 16 that contains rows and columns of dark reference pixels. The pixel array 100 uses a red, green, blue (RGB) Bayer pattern color filter array (CFA) (not shown) over the imaging pixels in area 10 to make the pixels sensitive to color. Alternatively, another color filter pattern may be used or the color filter array may be omitted for a monochrome pixel array 100. In the embodiments described herein, the color filter array is a Bayer pattern array over the imaging pixels in area 10 forming four color channels, blue, greenblue (green pixels in the same row as blue pixels), greenred (green pixels in the same row as red pixels), and red.

Dark reference pixels in area 16 are arranged in dark columns 19. A dark column is one that is not exposed to light and is often covered by a light shield, such as, for example, a metal-3 metallization layer, a black color filter, etc. It should be appreciated that dark columns 19 include dark reference pixels in area 16, for example tied pixels, optical black pixels, or a combination thereof. If optical black pixels are utilized in area 16, the optical black pixels have the same structure as the imaging pixels in area 10 except they are arranged in dark columns (i.e., shielded columns) so that incident light will not reach them and affect their signal output. If tied pixels are utilized in area 16, the photodiode within each tied pixel is connected to a fixed voltage via a metal contact so that the signal of the tied pixel is not affected by dark level non-uniformity. Additionally, dark reference pixels may, but need not, be arranged in dark rows (not shown) at the top or bottom of area 10. Dark reference pixels, such as, for example, optical black pixels and tied pixels, may be used to determine a dark reference value for row-wise dark level non-uniformity compensation of CMOS pixel arrays. Area 16 may have, for example, seventy-two columns of dark reference pixels. A dark reference value for row-wise dark level non-uniformity compensation may be determined as a function of the signal values of the dark reference pixels in area 16 (e.g., by averaging the pixel signal values).

Figure 1:
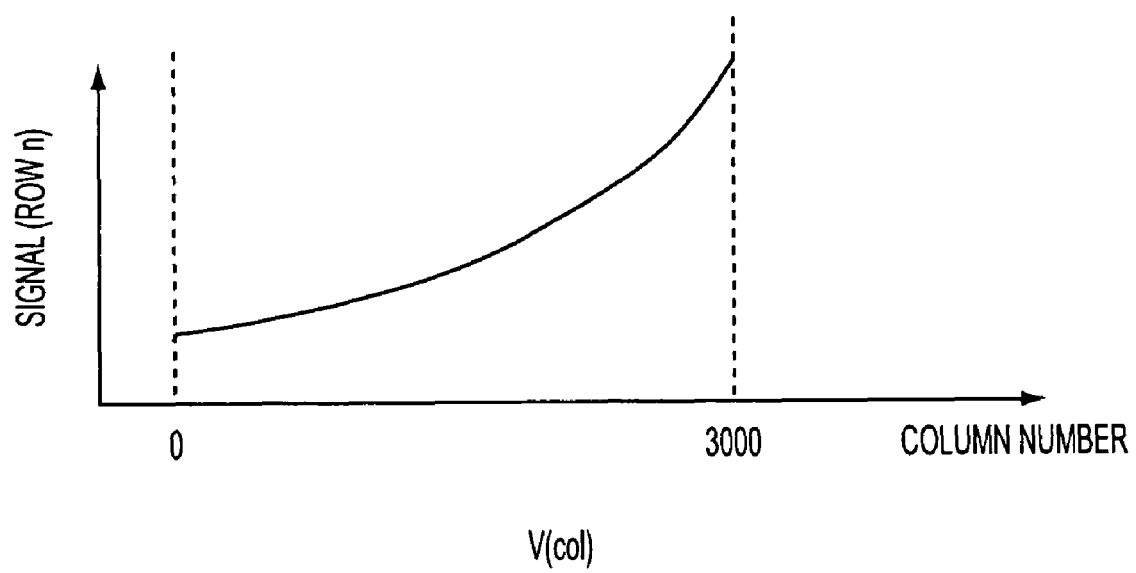
FIG. 1 shows a graph of the pixel signal value versus column number for a row that has not been dark level non-uniformity compensated.
Figure 3:
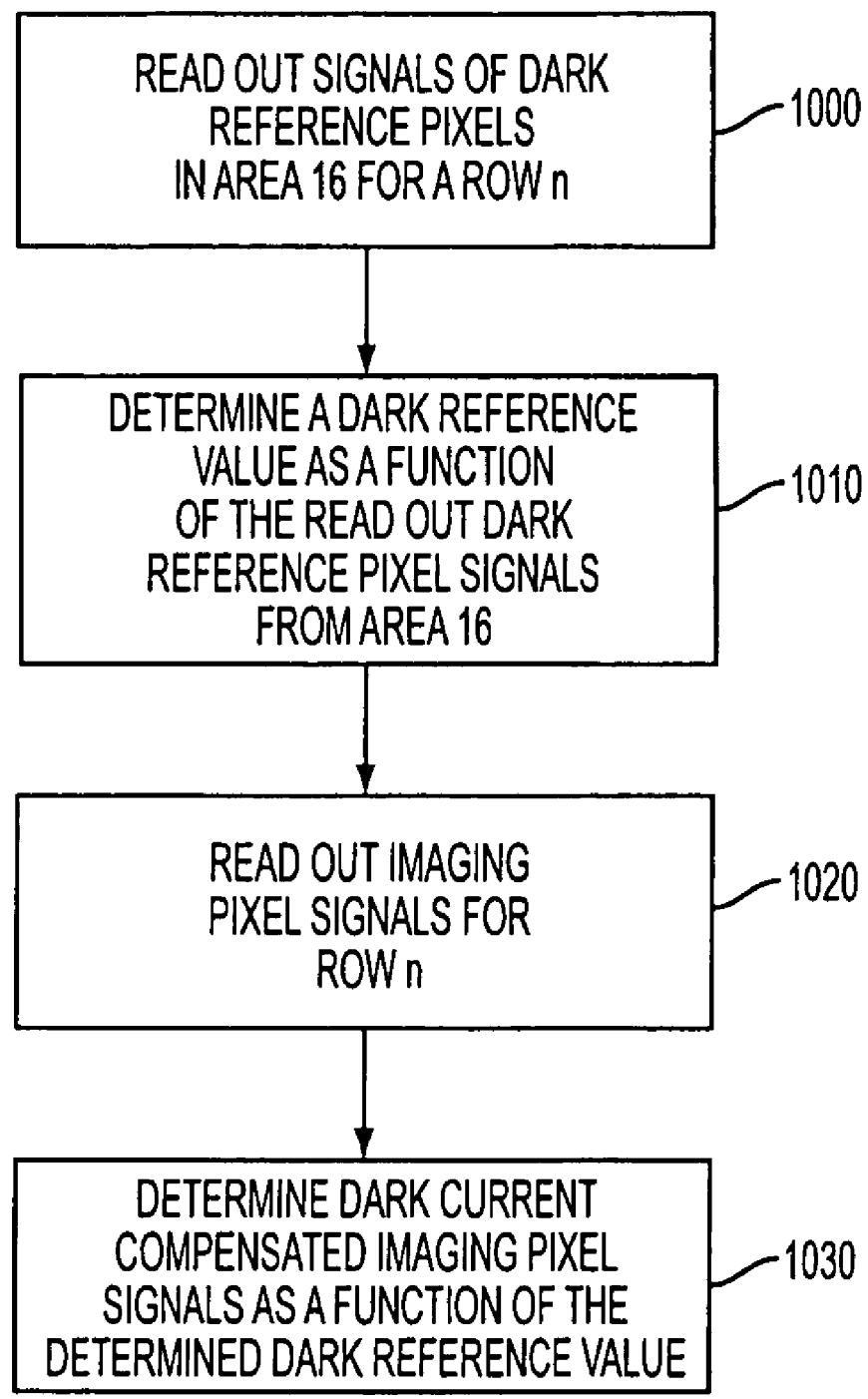
FIG. 3 illustrates a flowchart of a row-wise dark level non-uniformity compensation method based on a pixel array with one dark reference pixel area.
Figure 4:
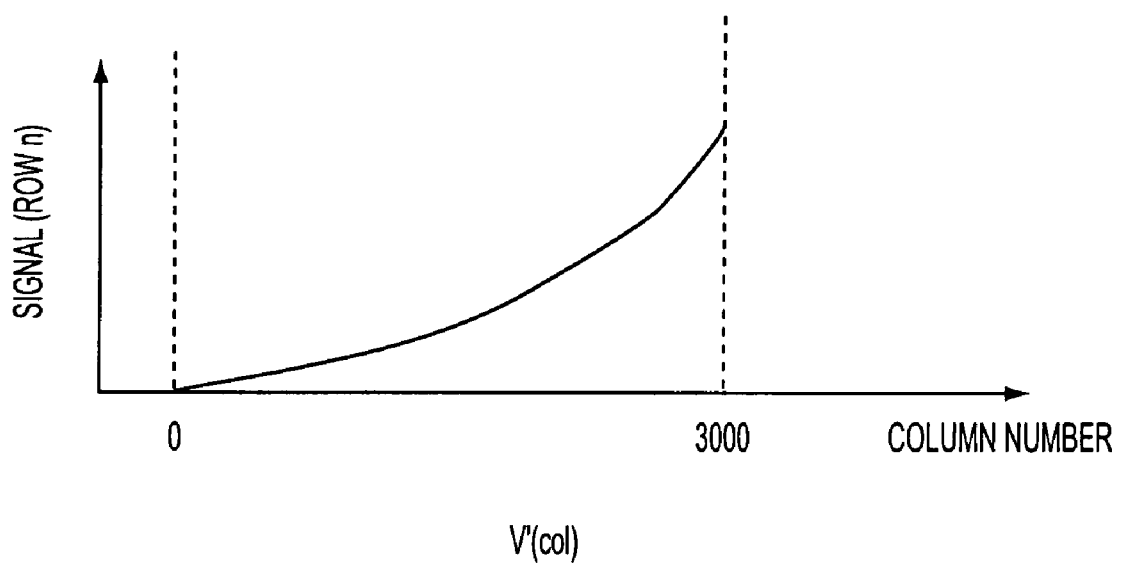
FIG. 4 shows a graph of the pixel signal value versus column number for a row that has been dark level non-uniformity compensated when the method of FIG. 3 is implemented.

The flowchart of FIG. 3 illustrates a process for row-wise dark level non-uniformity compensation using dark columns 19, with dark reference pixels in area 16 in the same row as each row of area 10 of FIG. 1. Initially, the signal values of dark reference pixels in a row n of area 16 (FIG. 1) are read out (step 1000). Next, the read out dark reference pixel signal values of row n of area 16 (FIG. 1) are processed to determine a dark reference value for use in row-wise dark level non-uniformity compensation of the signal values of imaging pixels in row n of area 10 (FIG. 1) (step 1010). Then, the signal values of the imaging pixels in row n of area 10 (FIG. 1) are read out (1020). A dark level non-uniformity compensated imaging pixel signal value is then determined for each imaging pixel of row n as a function of the determined dark reference value (1030). As a result, the dark level non-uniformity compensated imaging pixel signal values on the left side of the array are well correlated with the dark reference value and dark level non-uniformity is suppressed as shown in the graph of FIG. 4 which represents the imaging pixel signal values of row n of a flat-field image. However, the dark level non-uniformity compensated imaging pixel signal values on the right side of the array are not well correlated with the dark reference value and dark level non-uniformity is amplified.

Figure 5:
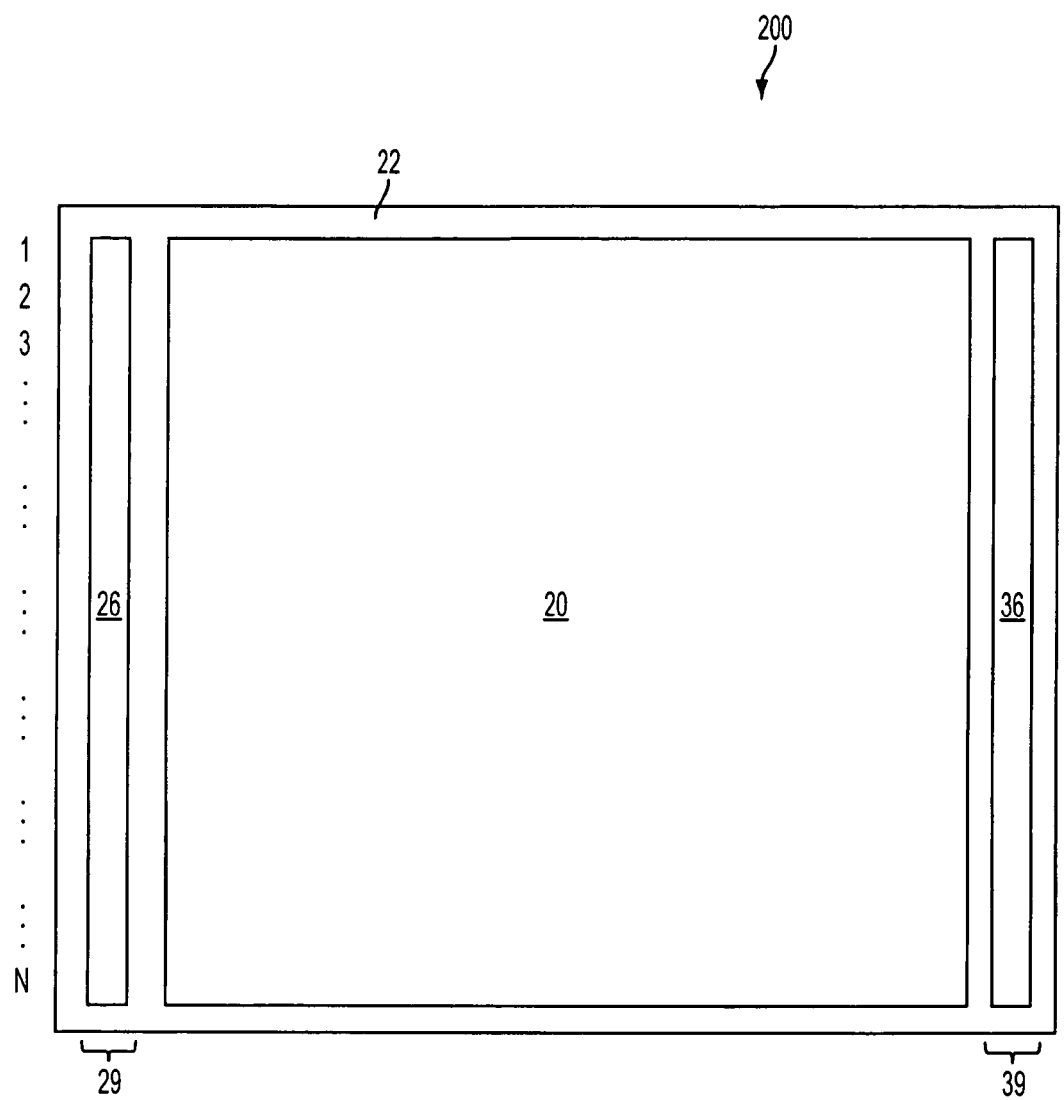
FIG. 5 illustrates a top view of a CMOS pixel array with dark columns located at two sides of the pixel array.

In an embodiment disclosed herein, the imaging sensor 100 of FIG. 2 is modified such that dark columns are placed on both sides of the array 100. As shown in FIG. 5, an exemplary CMOS pixel array 200 has an area 20 that contains rows and columns of imaging pixels, area 22 that contains rows and columns of barrier pixels which separate the imaging pixels from other pixels and circuits, area 26 that contains rows and columns of dark reference pixels to the left of area 20 arranged in dark columns 29, and area 36 that contains rows and columns of dark reference pixels to the right of area 20 arranged in dark columns 39. Dark reference pixel areas 26 and 36 may each contain any number of columns of dark reference pixels and may include, for example, tied pixels, optical black pixels, or a combination thereof. For example, areas 26 and 36 may each have thirty-six columns of dark reference pixels.

Figure 6:
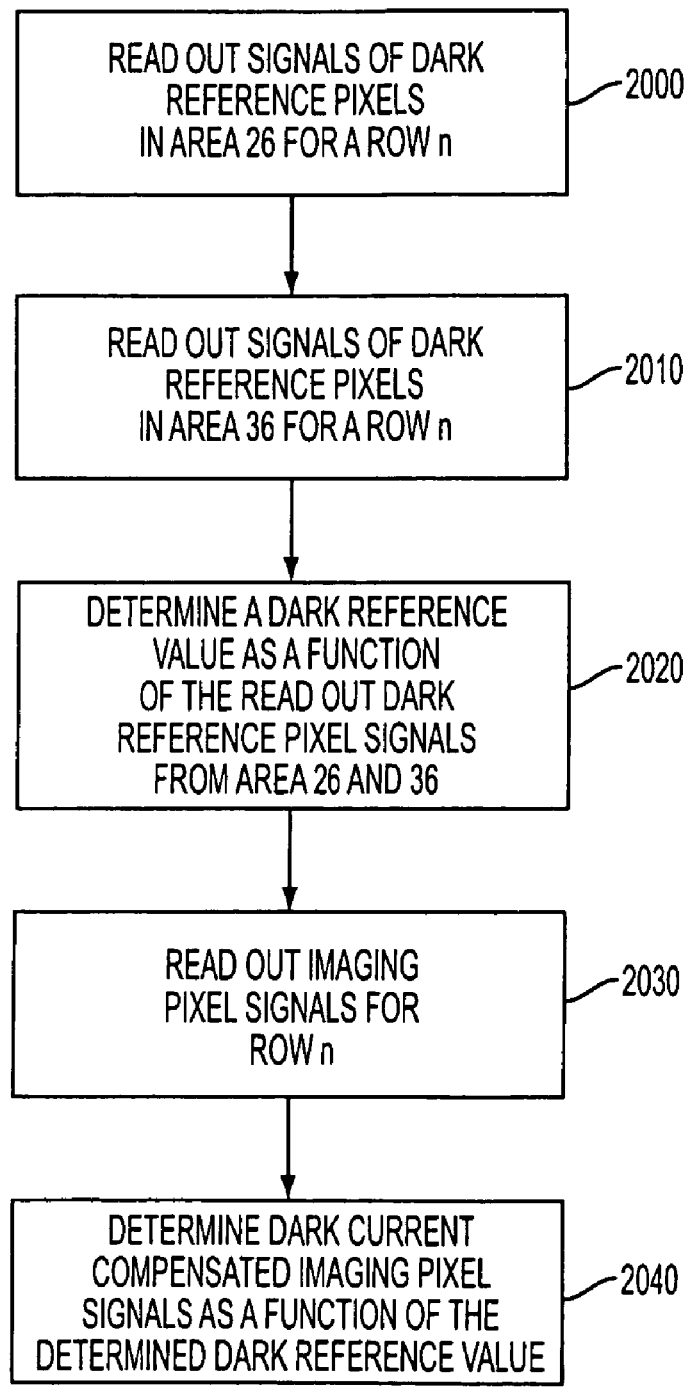
FIG. 6 illustrates a flowchart of a row-wise dark level non-uniformity compensation method based on a pixel array with two dark reference pixel areas.

The flowchart of FIG. 6 illustrates a process for dark level non-uniformity compensation using two dark columns 29 and 39, with dark reference pixels in areas 26 and 36, respectively, in the same row as each row of area 20 of FIG. 5. Initially, the signal values of the dark reference pixels in a row n of area 26 (FIG. 5) are read out (step 2000). Then, the signal values of the dark reference pixels in row n of area 36 (FIG. 5) are read out (step 2010). The read out dark reference pixel signal values of row n of area 26 (FIG. 5) and area 36 (FIG. 5) are processed to determine a dark reference value for use in dark level non-uniformity compensation of the signal values of imaging pixels in row n of area 20 (FIG. 5) (step 2020). It should be appreciated that the dark reference value can be determined by a constant function or a column dependent linear or parabolic function as described in more detail below. Then, the signal values of the imaging pixels in row n of area 20 (FIG. 5) are read out (2030). A dark level non-uniformity compensated imaging pixel signal value is then determined for each imaging pixel of row n as a function of the determined dark reference value (2040). It should be appreciated that in some instances, steps which follow other steps in the flowchart of FIG. 6 may be in reverse or in a different sequence except where a following procedural step requires the presence of a prior procedural step. For example, reading out the signal values of the imaging pixels in row n of area 20 (FIG. 5) (step 2030) may be performed prior to determining a dark reference value (step 2020).

The determination of step 2040 can be implemented by subtracting the determined dark reference value (step 2020) from the pixel signal values of the pixels of a given row. For example, the signal value of the imaging pixels of a given row n before row-wise dark level non-uniformity compensation is applied can be expressed as V(col), where col is the column location of an imaging pixel in row n being compensated (i.e., a target pixel). The signal values of the imaging pixels of a given row n after row-wise dark level non-uniformity compensation is applied can be expressed respectively as V'(col). The average of the signal values of all of the dark reference pixels in the left dark column for row n can be expressed as V(dark_left) and the average of the signal values of all of the dark reference pixels in the right dark column for row n can be expressed as V(dark_right).

Row-wise dark level non-uniformity compensation can be implemented by subtracting a constant dark reference value from each imaging pixel signal value of row n. For example:

$$V'(col) = V(col) - P0 \quad (1)$$

where P0 is a constant that is substantially similar to the average of all of the dark pixels in a given row. For example, the constant P0 can be expressed as:

$$P0 = \frac{V(dark\_left) + V(darl\_right)}{2} \quad (2)$$

Figure 7:
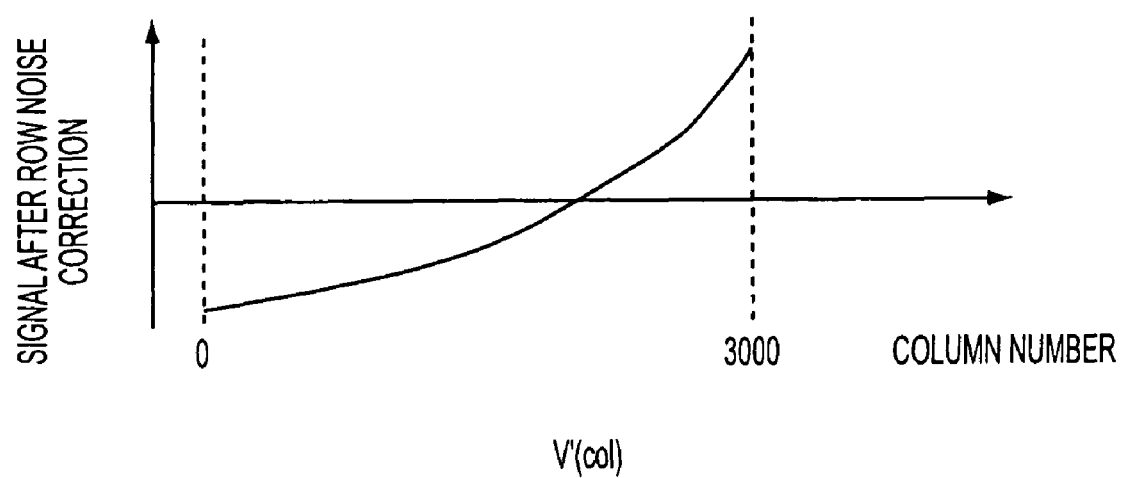
FIG. 7 shows a graph of dark level non-uniformity versus column number when the method of FIG. 6 is implemented with a dark level non-uniformity reference value determined by a constant function.

The row-wise dark level non-uniformity compensated imaging pixel V'(col) as shown in Equation (1) requires minimal computation and can be implemented quickly. As shown in FIG. 7, the corrected signal value V'(col) as determined using Equation (1) shifts the original signal value V(col) as shown in FIG. 1. Comparing the area under the curve shown in FIG. 4 (resulting from dark level non-uniformity compensation as described in the method of FIG. 3) with the area under the curve shown in FIG. 7, one can see a reduction in dark level non-uniformity in the double sided row-wise dark level non-uniformity constant dark reference value compensated signal in FIG. 7.

Row-wise dark level non-uniformity compensation can also be implemented by subtracting a column dependent dark reference value determined by a linear function from each imaging pixel signal value of row n. For example:

$$V'(col) = V(col) - \left(P0 - \frac{P1}{2} + \frac{P1}{Width} \cdot col\right) \quad (3)$$

where P0 and col are defined above, Width is the total number of columns of active pixels of a given row, and P1 is a constant that is substantially similar to the absolute value of the difference between the average of the dark reference pixel signal values in the right dark column for row n and the average of the dark reference pixel signal values in the left dark column for row n. For example, the constant P1 can be expressed as:

$$P1 = \frac{|V(dark\_right) - V(dark\_left)|}{2} \quad (4)$$

Figure 8:
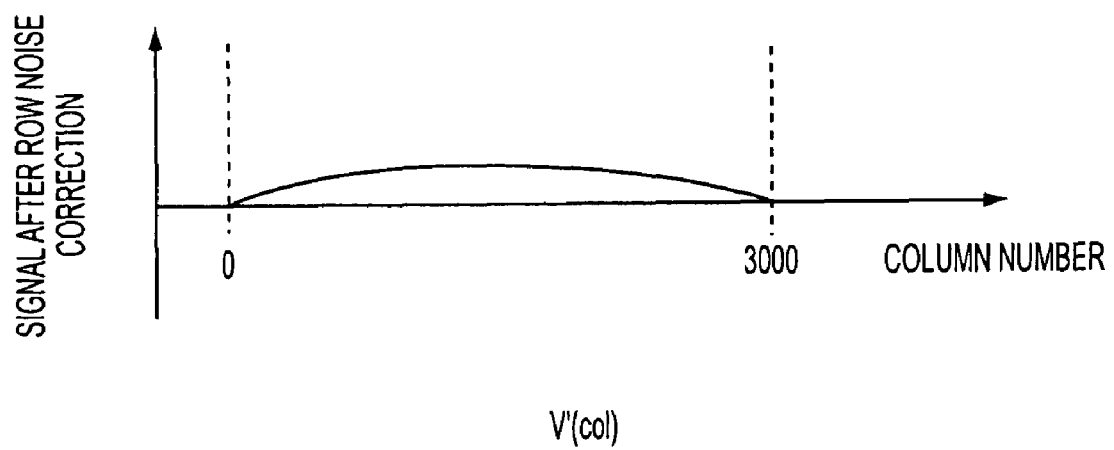
FIG. 8 shows a graph of dark level non-uniformity versus column number when the method of FIG. 6 is implemented with a column dependent dark level non-uniformity reference value determined by a linear function.

The row-wise dark level non-uniformity compensated imaging pixel value V'(col) as shown in Equation (3) requires more computation than the constant dark reference value method discussed above with relation to Equation (1), however, as shown in FIG. 8, the linear dark reference value corrected signal value V'(col) has significantly less noise than the constant dark reference corrected signal value V'(col) shown in FIG. 7.

Figure 9:
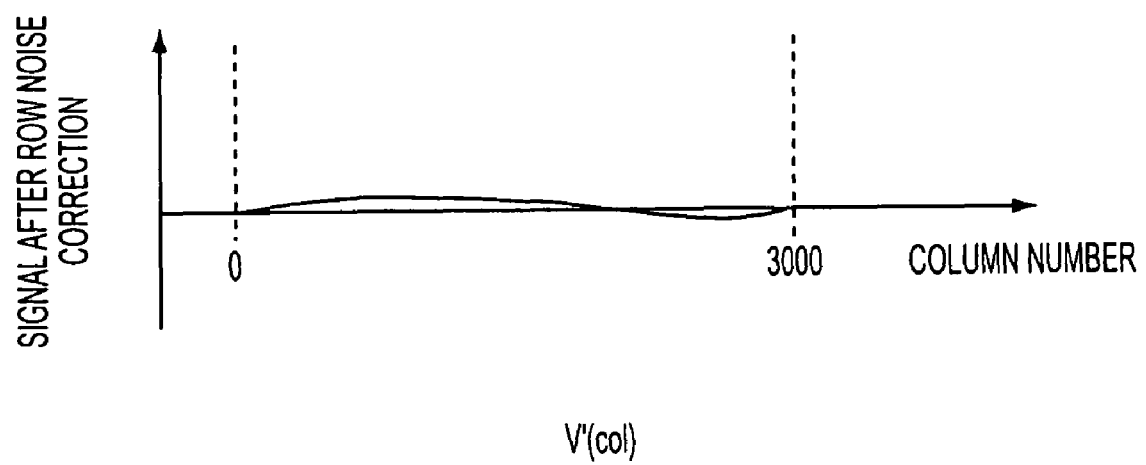
FIG. 9 shows a graph of dark level non-uniformity versus column number when the method of FIG. 6 is implemented with a column dependent dark level non-uniformity reference value determined by a parabolic function.

Additionally, row-wise dark level non-uniformity compensation can be implemented by subtracting a column dependent dark reference value determined by a parabolic function from each imaging pixel signal value of row n. For example:

$$V'(col) = \\ V(col) - \left(P0 - \frac{P1}{2} + \frac{P1}{Width} \cdot col + P1 \cdot \left(P2 \cdot \left(\frac{2 \cdot col}{Width} - 1\right)^2 - P2\right)\right) \quad (5)$$

where P0, P1, col, and Width are defined above and P2 is a parabolic parameter that defines the curvature of a parabolic curve fitting for the original signal value V(col), for example, as shown in FIG. 1. P2 may, but need not, be within the range of approximately 0 to approximately 0.3. For example, P2 may be set to approximately 0.2. The row-wise dark level non-uniformity compensated imaging pixel value V'(col) as shown in Equation (5) requires more computation than both the constant and linear dark reference value methods discussed above, however, as shown in FIG. 9, the corrected signal value V'(col) has less noise than the linear dark reference value corrected signal value V'(col) (FIG. 7) and the constant dark reference corrected signal value V'(col) (FIG. 8). Additionally, the use of the parabolic parameter P2 allows for the row-wise dark level non-uniformity compensation to be adjusted to the best fit on real noise curves.

Figure 10A:
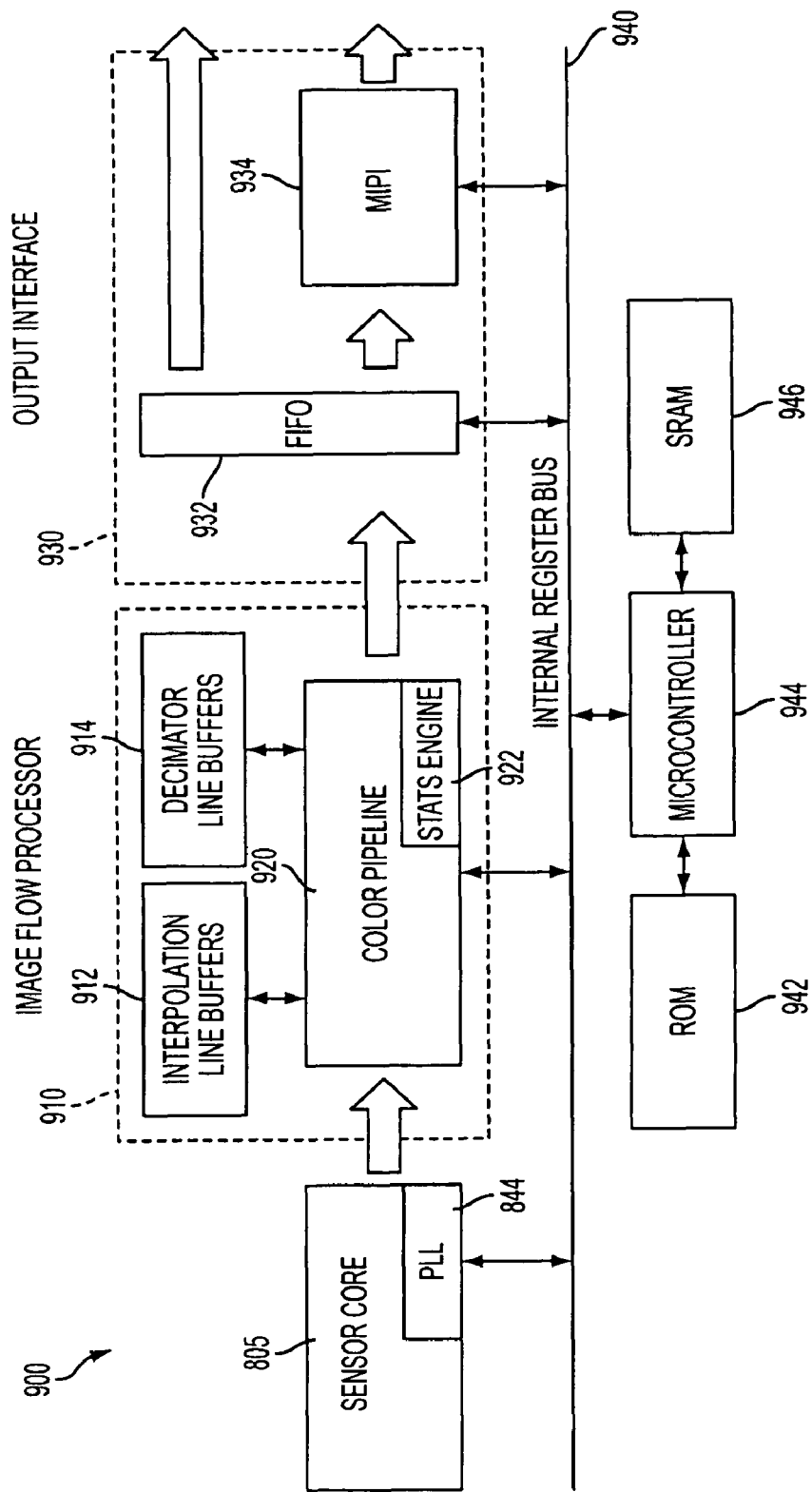
FIG. 10A illustrates a block diagram of system-on-a-chip imaging device constructed in accordance with an embodiment.

FIG. 10A illustrates a block diagram of an exemplary system-on-a-chip (SOC) imaging device 900 constructed in accordance with an embodiment. The imaging device 900 comprises a sensor core 805 that communicates with an image flow processor 910 that is also connected to an output interface 930. A phase locked loop (PLL) 844 is used as a clock for the sensor core 805. The image flow processor 910, which is responsible for image and color processing, includes interpolation line buffers 912, decimator line buffers 914, and a color pipeline 920. One of the functions of the color processor pipeline 920 is to perform pixel processing operations. The color pipeline 920 includes, among other things, a statistics engine 922. The output interface 930 includes an output first-in-first-out (FIFO) parallel output 932 and a serial Mobile Industry Processing Interface (MIPI) output 934. The user can select either a serial output or a parallel output by setting registers within the chip. An internal register bus 940 connects read only memory (ROM) 942, a microcontroller 944 and a static random access memory (SRAM) 946 to the sensor core 805, image flow processor 910 and the output interface 930.

Figure 10B:
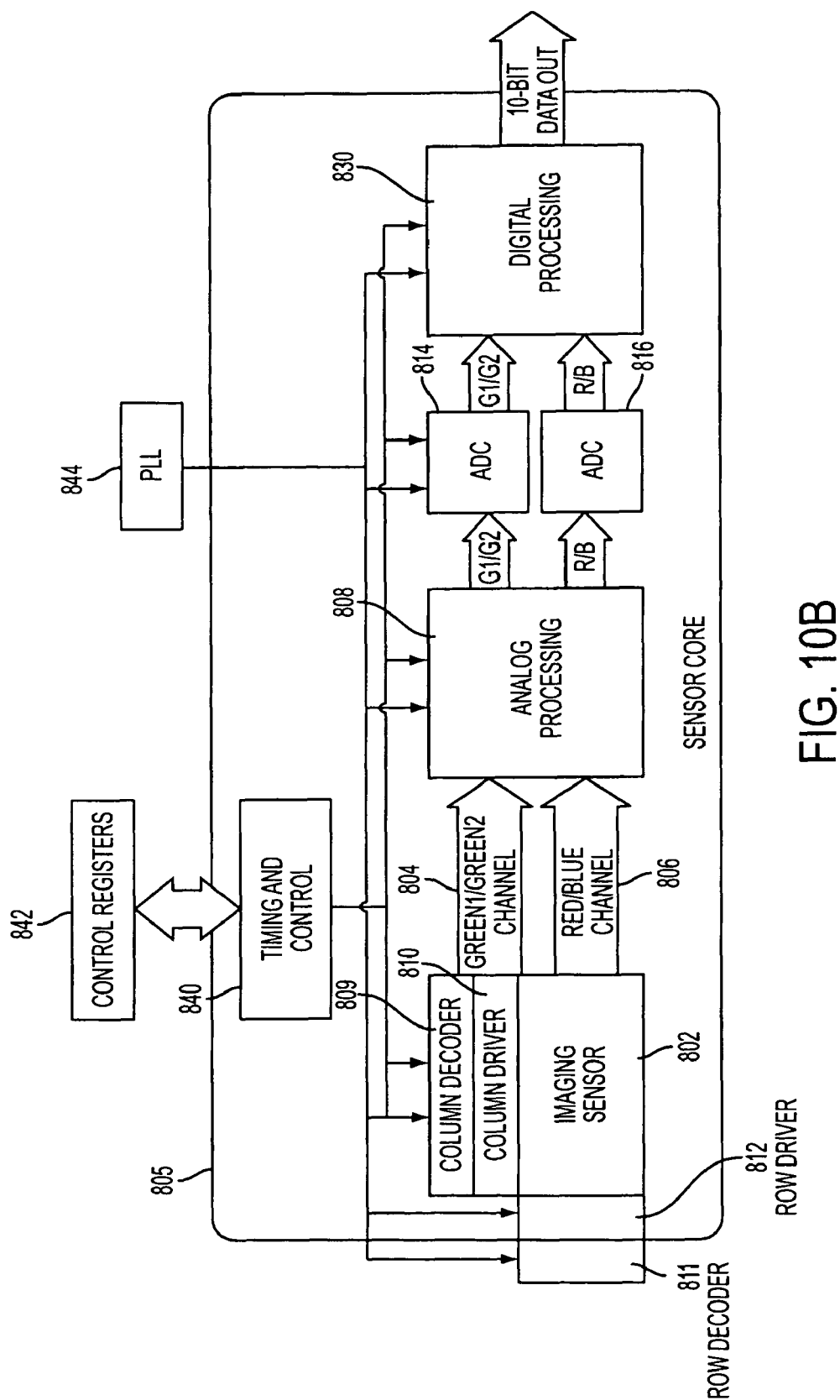
FIG. 10B illustrates an example of a sensor core used in the FIG. 10A device.

FIG. 10B illustrates a sensor core 805 used in the FIG. 10A imaging device 900. The sensor core 805 includes an imaging sensor 802, which is connected to analog processing circuitry 808 by a greenred/greenblue channel 804 and a red/blue channel 806. Although only two channels 804, 806 are illustrated, there are effectively two green channels, one red channel, and one blue channel, for a total of four channels. The greenred (i.e., Green1) and greenblue (i.e., Green2) signal values are readout at different times (using channel 804) and the red and blue signal values are readout at different times (using channel 806). The analog processing circuitry 808 outputs processed greenred/greenblue signal values G1/G2 to a first analog-to-digital converter (ADC) 814 and processed red/blue signal values R/B to a second analog-to-digital converter 816. The outputs of the two analog-to-digital converters 814, 816 are sent to a digital processor 830.

Connected to, or as part of, the imaging sensor 802 are row and column decoders 811, 809 and row and column driver circuitry 812, 810 that are controlled by a timing and control circuit 840. The timing and control circuit 840 uses control registers 842 to determine how the imaging sensor 802 and other components are controlled. As set forth above, the PLL 844 serves as a clock for the components in the core 805.

The imaging sensor 802 comprises a plurality of pixel circuits arranged in a predetermined number of columns and rows. Imaging sensor 802 may be configured with dark columns in accordance with the embodiments described herein. In operation, the pixel circuits of each row in imaging sensor 802 are all turned on at the same time by a row select line and the pixel circuits of each column are selectively output onto column output lines by a column select line. A plurality of row and column lines are provided for the entire imaging sensor 802. The row lines are selectively activated by row driver circuitry 812 in response to the row address decoder 811 and the column select lines are selectively activated by a column driver 810 in response to the column address decoder 809. Thus, a row and column address is provided for each pixel circuit. The timing and control circuit 840 controls the address decoders 811, 809 for selecting the appropriate row and column lines for pixel readout (for example, reading out the dark reference pixels in area 26 (FIG. 5) for a row n, then reading out the dark reference pixels in area 36 (FIG. 5) for a row n, followed by the readout of the row n active pixels in area 10 (FIG. 5)) and the row and column driver circuitry 812, 810, which apply driving voltage to the drive transistors of the selected row and column lines.

Each column contains sampling capacitors and switches in the analog processing circuit 808 that read a pixel reset signal Vrst and a pixel image signal Vsig for selected pixel circuits. Because the core 805 uses greenred/greenblue channel 804 and a separate red/blue channel 806, circuitry 808 will have the capacity to store Vrst and Vsig signals for greenred, greenblue, red, and blue pixel signals. A differential signal (Vrst-Vsig) is produced by differential amplifiers contained in the circuitry 808 for each pixel. Thus, the signals G1/G2 and R/B are differential signals that are then digitized by a respective analog-to-digital converter 814, 816. The analog-to-digital converters 814, 816 supply digitized G1/G2, R/B pixel signals to the digital processor 830, which forms a digital image output (e.g., a 10-bit digital output). The digital processor 830 performs pixel processing operations, including dark level non-uniformity compensation in accordance with the disclosed embodiments. The output is sent to the image flow processor 910 (FIG. 10A).

Although the sensor core 805 has been described with reference to use with a CMOS imaging sensor, this is merely one example sensor core that may be used. Embodiments of the invention may also be used with other sensor cores having a different readout architecture. While the imaging device 900 (FIG. 10A) has been shown as a system-on-a-chip, it should be appreciated that the embodiments are not so limited. Other imaging devices, such as, for example, a stand-alone sensor core 805 coupled to a separate signal processing chip could be used in accordance with the embodiments. While the dark level non-uniformity compensation has been described as occurring in the digital processor 830 (FIG. 10B), it should be appreciated that dark level non-uniformity compensation can be performed in the color processor pipeline 920 of the image flow processor 910 (FIG. 10A). Additionally, imaging and dark reference pixel (e.g., optical black pixel and tied pixel) data from the imaging sensor 802 (FIG. 10B) can be output from the 10-bit data output (FIG. 10B) and stored and compensated elsewhere, for example, in a system as described in relation to FIG. 11 or in a stand-alone image processing system.

Figure 11:
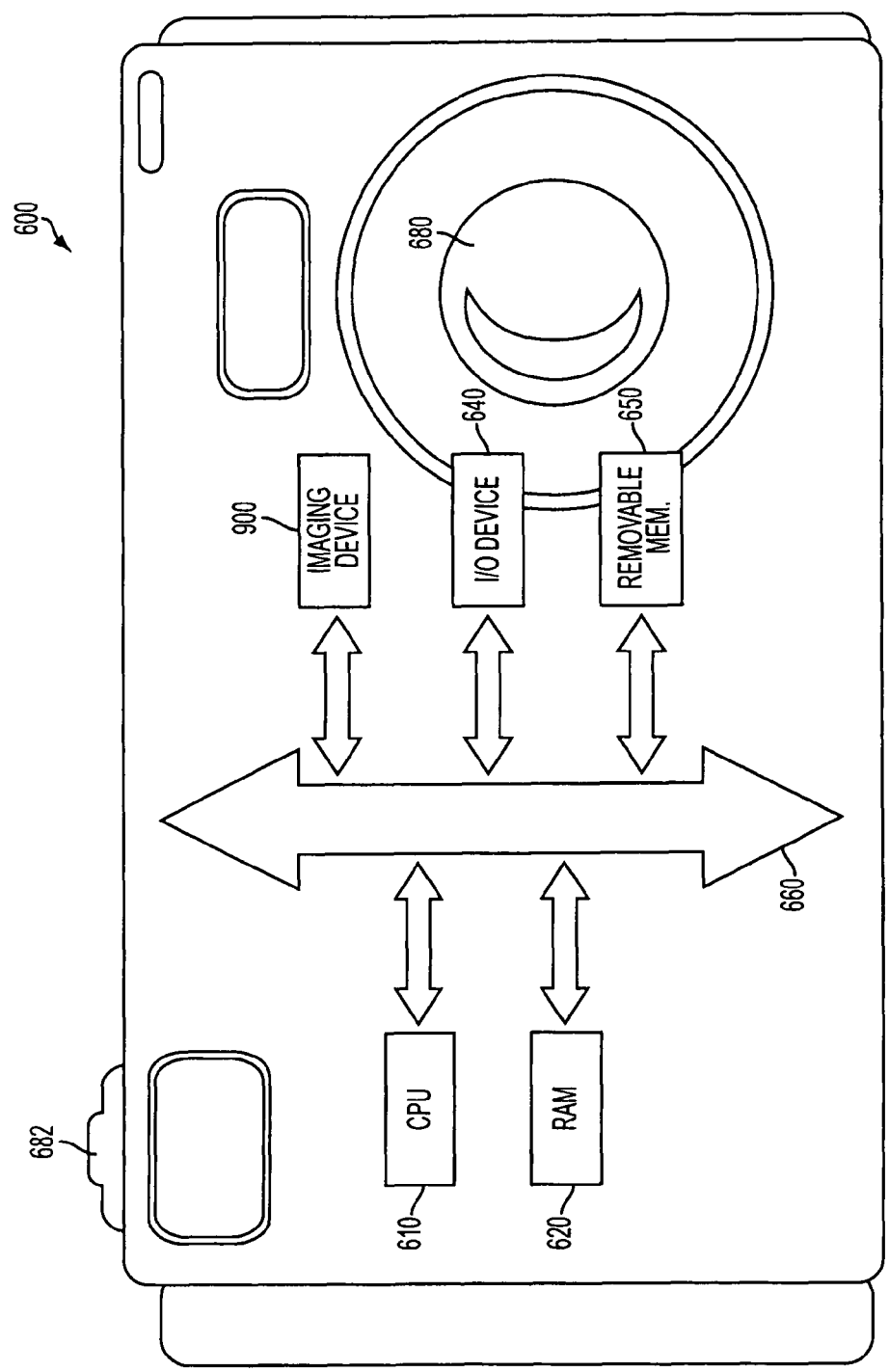
FIG. 11 shows a system embodiment incorporating at least one imaging device.

FIG. 11 shows a typical system 600, such as, for example, a camera system. The system 600 is an example of a system having digital circuits that could include imaging devices 900. Without being limiting, such a system could include a computer system, camera system, scanner, machine vision, vehicle navigation system, video phone, surveillance system, auto focus system, star tracker system, motion detection system, image stabilization system, and other systems employing an imaging device 900.

System 600, for example, a camera system, includes a lens 680 for focusing an image on the imaging device 900 when a shutter release button 682 is pressed. System 600 generally comprises a central processing unit (CPU) 610, such as a microprocessor that controls camera functions and image flow, and communicates with an input/output (I/O) device 640 over a bus 660. The imaging device 900 also communicates with the CPU 610 over the bus 660. The system 600 also includes random access memory (RAM) 620, and can include removable memory 650, such as flash memory, which also communicates with the CPU 610 over the bus 660. The imaging device 900 may be combined with the CPU 610, with or without memory storage on a single integrated circuit, such as, for example, a system-on-a-chip, or on a different chip than the CPU 610. As described above, uncompensated data from the imaging sensor 802 (FIG. 10B) can be output from the imaging device 900 and stored, for example in the random access memory 620 or the CPU 610. Dark level non-uniformity compensation can then be performed on the stored data by the CPU 610, or can be sent outside the camera and stored and operated on by a stand-alone processor, e.g., a computer, external to system 600 in accordance with the embodiments described herein.

Some of the advantages of the dark level non-uniformity compensation methods and apparatuses disclosed herein include reducing row-wise dark level non-uniformity thereby improving the image quality for high resolution imaging sensors and improving imaging sensors' performance at increased frequencies. Additionally, the disclosed dark level non-uniformity compensation methods are simple to implement in existing imaging device designs. The disclosed dark level non-uniformity compensation methods are simple to implement in hardware or software at a low cost. That is, the methods described above can be implemented in a pixel processing circuit, which can be part of the pixel processing pipeline 920 (FIG. 10A). The pixel processing circuit can be implemented as, for example, hardware logic, a programmed processor, a combination of the two, or with other signal processing circuits. For example, the methods described above can be implemented in computer instructions and stored in a computer readable medium to perform a method of adjusting an imaging pixel signal value as a function of a dark reference value and the imaging pixel signal value to produce a dark level non-uniformity compensated pixel signal value.

While the embodiments have been described in detail in connection with preferred embodiments known at the time, it should be readily understood that the claimed invention is not limited to the disclosed embodiments. Rather, the embodiments can be modified to incorporate any number of variations, alterations, substitutions, or equivalent arrangements not heretofore described. For example, row-wise dark level non-uniformity compensation is not limited by the linear and parabolic functions described above; any known curve fitting method may be used to fit real noise curves. While the embodiments are described in connection with a CMOS imaging sensor, they can be practiced with other types of imaging sensors. Additionally, three or five channels, or any number of color channels may be used, rather than four, for example, and they may comprise additional or different colors/channels than greenred, red, blue, and greenblue, such as e.g., cyan, magenta, yellow (CMY); cyan, magenta, yellow, black (CMYK); or red, green, blue, indigo (RGBI). Accordingly, the invention is not limited by the specific embodiments described herein, but is only limited by the scope of the appended claims.

What is claimed as new and desired to be protected by Letters Patent of the United States is:

1. A method of adjusting imaging pixel signals produced by pixels in a row of a pixel array, the method comprising:
   acquiring first dark signal values from a first area of dark reference pixels in the row;
   acquiring second dark signal values from a second area of dark reference pixels in the row;
   acquiring pixel signals values from an area of imaging pixels in the row between the first and second areas, wherein each pixel signal has a respective column location;
   determining a column dependent dark reference value for a target pixel having a respective acquired pixel signal value, wherein the column dependent dark reference value is based on the acquired first and second dark pixel values and changes in accordance with a column location of the target pixel; and
   determining an adjusted pixel signal value for the target pixel as a function of the column dependent dark reference value and the acquired target pixel signal value, wherein the column dependent dark reference value changes in accordance with a linear function based on a column location of the target pixel and wherein the determined adjusted pixel signal value is determined by:

$$V'(col) = V(col) - \left(P0 - \frac{P1}{2} + \frac{P1}{\text{Width}} \cdot col\right)$$

where col is the column location of the target pixel, V'(col) is the determined adjusted pixel signal value for the target pixel, V(col) is the acquired pixel signal value for the target pixel, Width is the total number of columns of active pixels of the row, P0 is $$P0 = \frac{V(\text{dark\_left}) + V(\text{dark\_right})}{2}$$

where V(dark_left) is the average of the acquired first dark signal values and V(dark_right) is the average of the acquired second dark signal values and P1 is $$P1 = \frac{|V(\text{dark\_right}) - V(\text{dark\_left})|}{2}.$$

2. The method of claim 1, further comprising determining a column dependent dark reference value for a target pixel at each column location having a respective acquired pixel signal value and determining an adjusted pixel signal value for each target pixel.

3. A method of adjusting imaging pixel signals produced by pixels in a row of a pixel array, the method comprising:
   acquiring first dark signal values from a first area of dark reference pixels in the row;
   acquiring second dark signal values from a second area of dark reference pixels in the row;
   acquiring pixel signals values from an area of imaging pixels in the row between the first and second areas, wherein each pixel signal has a respective column location;
   determining a column dependent dark reference value for a target pixel having a respective acquired pixel signal value, wherein the column dependent dark reference value is based on the acquired first and second dark pixel values and changes in accordance with a column location of the target pixel; and
   determining an adjusted pixel signal value for the target pixel as a function of the column dependent dark reference value and the acquired target pixel signal value, wherein the column dependent dark reference value changes in accordance with a parabolic function based on a column location of the target pixel.

4. The method of claim 3, wherein the determined adjusted pixel signal value is determined by:

$$V'(col) = V(col) - \left(P0 - \frac{P1}{2} + \frac{P1}{\text{Width}} \cdot col + P1 \cdot \left(P2 \cdot \left(\frac{2 \cdot col}{\text{Width}} - 1\right)^2 - P2\right)\right)$$

where col is the column location of the target pixel, V'(col) is the determined adjusted pixel signal value for the target pixel, V(col) is the acquired pixel signal value for the target pixel, Width is the total number of columns of active pixels of the row, P0 is $$P0 = \frac{V(\text{dark\_left}) + V(\text{dark\_right})}{2}$$

where V(dark_left) is the average of the acquired first dark signal values and V(dark_right) is the average of the acquired second dark signal values and P1 is $$P1 = \frac{|V(\text{dark\_right}) - V(\text{dark\_left})|}{2}$$

and P2 is a predetermined parabolic parameter that defines a curvature of a parabolic curve fitting for the acquired pixel signal values.

5. The method of claim 4, wherein P2 is within the range of approximately 0 to approximately 0.3.

6. An imaging device comprising:
   an imaging sensor comprising an array of pixels having dark reference pixels and imaging pixels each having a respective column location, wherein a first area of dark reference pixels is located at one side of the imaging pixels and a second area of dark reference pixels is located at an other side of the imaging pixels; and
   a signal processing circuit for adjusting imaging pixel signals using respective column dependent dark reference values derived from the dark reference pixels and the respective column locations of the imaging pixels, wherein the column dependent dark reference values are determined by a function which produces different column dependent dark reference values in accordance with a column location of an imaging pixel, wherein the function is a parabolic function.

7. The imaging device of claim 6, wherein the dark reference pixels comprise at least one of optical black pixels and tied pixels.

8. The imaging device of claim 6, wherein the determined respective column dependent dark reference values are determined from a parabolic dark reference value function using a parabolic parameter that defines a curvature of a parabolic curve fitting for the imaging pixel signal values.

9. The imaging device of claim 8, wherein the parabolic parameter is set to approximately 0.2.

* * * * *